(12) United States Patent
Qiao et al.

(10) Patent No.: US 11,034,328 B2
(45) Date of Patent: Jun. 15, 2021

(54) VEHICLE THEFT DETERRENT UTILIZING DRIVER IDENTIFICATION SEATBELT SYSTEM

(71) Applicant: Continental Automotive Systems, Inc., Auburn Hills, MI (US)

(72) Inventors: Ningsheng Qiao, Troy, MI (US); Manjunath P Venkataramana, Rochester Hills, MI (US); Robert Andres, Clarkston, MI (US); Dean Beckman, Highland, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 245 days.

(21) Appl. No.: 16/201,790

(22) Filed: Nov. 27, 2018

(65) Prior Publication Data

US 2020/0164834 A1    May 28, 2020

(51) Int. Cl.
*B60R 25/01* (2013.01)
*B60R 22/48* (2006.01)
*B60R 25/04* (2013.01)
*B60R 25/102* (2013.01)
*G06K 9/00* (2006.01)
*H04W 4/40* (2018.01)

(52) U.S. Cl.
CPC ............ *B60R 25/018* (2013.01); *B60R 22/48* (2013.01); *B60R 25/04* (2013.01); *B60R 25/102* (2013.01); *G06K 9/00087* (2013.01); *H04W 4/40* (2018.02)

(58) Field of Classification Search
None
See application file for complete search history.

(56) References Cited

U.S. PATENT DOCUMENTS

| 8,300,891 B2 | 10/2012 | Chen et al. |
| 2014/0294240 A1 | 10/2014 | Hong et al. |

FOREIGN PATENT DOCUMENTS

WO    WO-2018090263 A1 *  5/2018  ............. B60R 22/48

* cited by examiner

*Primary Examiner* — Todd Melton

(57) ABSTRACT

A driver identification seatbelt system including a seatbelt system having at least one first belt with a first coupling member, and a second coupling member. The driver identification seatbelt system further including a fingerprint recognition member.

16 Claims, 5 Drawing Sheets

VEHICLE THEFT DETERRENT UTILIZING DRIVER IDENTIFICATION SEATBELT SYSTEM

TECHNICAL BACKGROUND

Motor vehicle theft remains a significant issue despite downward trends and increasing technology in new vehicles to prevent theft. According to the National Insurance Crime Bureau (NICB), a motor vehicle is stolen on average every 45 seconds in the United States.

Various attempts have been made to discourage vehicle theft. For example, various approaches have been used that attempt to lock a vehicle and thereby prevent theft. In other examples, security systems have been developed and employed in vehicles. For example, when the vehicle owner leaves their vehicle, the vehicle is locked, and the security system is activated. If an unauthorized person tries to enter the car, an alarm is sounded. In some previous approaches, a signal is sent to a remote site (such as a police station) so that the intruder can be stopped, and the theft of the vehicle prevented.

Unfortunately, these previous approaches have not always been successful in defeating attempts to enter and steal vehicles. For example, the sound of activated security alarm systems has become so common place in many areas that the sound of the alarm is often ignored, and the intruder can continue with their activities unimpeded. In addition, the owner of the vehicle is unaware that the attempted theft is occurring.

In the case where the car alarm transmits a signal to alert security personnel, various approaches have been used by criminals to defeat this security approach. For example, the criminal may simply drape the car in some material that interferes with the transmission of the signal to the police. Then, the criminal can break into and steal the vehicle unimpeded since a transmission made by the security system of the vehicle to an external security center will never be received by the external security center.

What is needed is a better way to prevent motor vehicle theft, with multimodal identification system and offering a higher degree of protection.

BRIEF SUMMARY

A driver identification seatbelt system including a seatbelt system having at least one first belt with a first coupling member, and a second coupling member. The seatbelt system further including a fingerprint recognition member.

In one or more embodiments, a driver identification seatbelt system includes a first belt with a first coupling member, a second coupling member configured to couple with the first coupling member, and at least one of the first coupling member or the second coupling member communicatively coupled with a fingerprint recognition member, the fingerprint recognition member having a fingerprint recognition function.

In one or more embodiments, the system further includes at least one second belt coupled with the second coupling member.

In one or more embodiments, wherein both the first coupling member and the second coupling member include the fingerprint recognition member.

In one or more embodiments, the system further includes a processor communicatively coupled with the fingerprint recognition member, the processor configured to evaluate whether a detected fingerprint matches a previously stored fingerprint.

In one or more embodiments, the system further includes a communications system communicatively coupled with the processor.

In one or more embodiments, the system further includes an engine immobilizer communicatively coupled with the processor.

In one or more embodiments, the driver identification seatbelt system has one or more of a normal mode, a protection mode, a service mode, or a collision mode.

In one or more embodiments, the driver identification seatbelt system has at least a normal mode and a protection mode.

A method includes detecting and reading a driver fingerprint with a driver identification seatbelt system of a vehicle, the driver identification seatbelt system including a seatbelt system having at least one first belt with a first coupling member, and a second coupling member, the seatbelt system further including a fingerprint recognition member, evaluating whether detected fingerprint matches a pre-stored fingerprint, and determining a system mode using the detected fingerprint.

In one or more embodiments, the system further includes setting the driver identification seatbelt system to a normal mode if the detected fingerprint matches the pre-stored fingerprint.

In one or more embodiments, the system further includes setting the driver identification seatbelt system to a protective mode if the detected fingerprint does not match the pre-stored fingerprint.

In one or more embodiments, the system further includes sending a message to a car owner via V2P channel.

In one or more embodiments, the system further includes locking the first coupling member with the second coupling member.

In one or more embodiments, the system further includes determining velocity of the vehicle.

In one or more embodiments, the system further includes activating an engine immobilizer and preventing operation of an engine of the vehicle if the velocity of the vehicle is equal to 0 mph and a gear state is in park.

In one or more embodiments, the system further includes limiting velocity of the vehicle if the velocity of the vehicle is greater than 0 mph.

In one or more embodiments, the system further includes evaluating whether the vehicle has been in a vehicle collision and placing the driver identification seatbelt system into a collision mode if the vehicle collision has been detected.

In one or more embodiments, a method includes detecting and reading a driver fingerprint with a driver identification seatbelt system, the driver identification seatbelt system including a seatbelt system having at least one first belt with a first coupling member, and a second coupling member, the seatbelt system further including a fingerprint recognition member, evaluating whether detected fingerprint matches a pre-stored fingerprint, determining a system mode using the detected fingerprint.

In one or more embodiments, the method further includes sending a message to a car owner via V2P channel.

In one or more embodiments, the method further includes determining velocity of the vehicle, and activating an engine immobilizer and preventing operation of an engine of the vehicle if the velocity of the vehicle is equal to 0 mph and a gear state is in park.

These and other embodiments, aspects, advantages, and features of the present invention will be set forth in part in the description which follows and will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims and their equivalents.

DETAILED DESCRIPTION

The following detailed description includes references to the accompanying drawings, which form a part of the detailed description. The drawings show, by way of illustration, specific embodiments in which the apparatus may be practiced. These embodiments, which are also referred to herein as "examples" or "options," are described in enough detail to enable those skilled in the art to practice the present embodiments. The embodiments may be combined, other embodiments may be utilized, or structural or logical changes may be made without departing from the scope of the invention. The following detailed description is, therefore, not to be taken in a limiting sense and the scope of the invention is defined by the appended claims and their legal equivalents.

A driver identification seatbelt system uses fingerprint recognition technology in an intelligent seat belt system to recognize unauthorized drivers and to act to deter the theft. The actions can include notifying the vehicle owner or manager of unauthorized use, locking the seat belt around the unauthorized driver, limiting the vehicle speed to a low level, or immobilizing the vehicle if it is already stationary. In accordance with one or more embodiments, the driver identification seatbelt system includes a seatbelt system having at least one first belt with a first coupling member, and a second coupling member. The driver identification seatbelt system further includes a fingerprint recognition member. The driver identification seatbelt system can be used in conjunction with vehicles which require a driver to fasten the seatbelt in a locked position prior to placing the vehicle in a driving gear.

Figure 1:
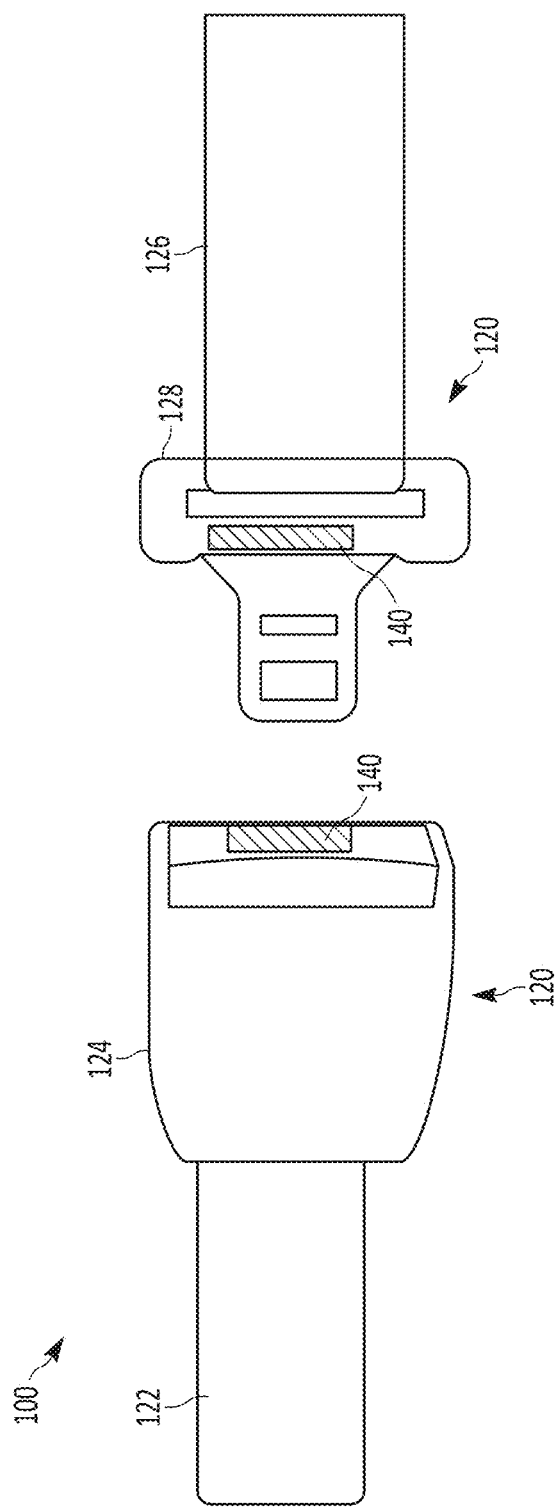
FIG. 1 illustrates a fingerprint recognition member, as constructed in accordance with one or more embodiments.
Figure 2:
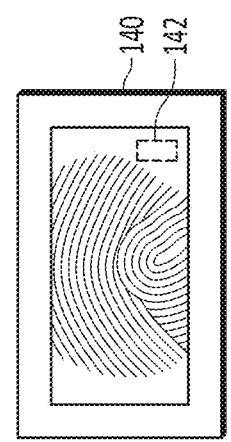
FIG. 2 illustrates first and second belts with first and second coupling members, as constructed in accordance with one or more embodiments.

Referring to FIG. 1, the driver identification seatbelt system 100 includes a belt system 120. The belt system 120 includes a first belt 122 with a first coupling member 124. The belt system further includes a second coupling member 128 with an optional second belt 126. In one or more embodiments the first and second coupling members 124, 128 include a projection of one member that is received within the other member and is locked once fully inserted therein. The first and second coupling members 124, 128 can be released from each other, for example, by depressing a tab on one of the members to release the other members.

In one or more embodiments, at least one of the first coupling member 124 or the second coupling member 128 are communicatively coupled with a fingerprint recognition member 140. In one or more embodiments, the fingerprint recognition member 140 is included with the first coupling member 124 and/or the second coupling member 128. The fingerprint recognition member 140 has fingerprint recognition function such that once a finger is placed against the fingerprint recognition member 140, the fingerprint can be recognized and optionally stored. In one or more embodiments, the fingerprint recognition member 140 includes a processor 142 allows for the vehicle owner (or other agent of the owner) to record and store fingerprints of drivers permitted to use the vehicle. Optionally, the vehicle owner can add or delete fingerprints of permitted drivers for the vehicle. The processor 142 is communicatively coupled with the finger print recognition member, and the processor 142 is configured to evaluate whether a detected finger print matches a previously stored finger print.

In one or more embodiments, the fingerprint recognition member 140 can be located on or within the first coupling member 124 and/or the second coupling member 128. In one or more embodiments, the fingerprint recognition member 140 can be located in other locations accessible by the driver including, but not limited to, the dash, touch screen, start/stop button, steering wheel, windshield, visor, door, door controls, and/or gear shifter.

Figure 3:
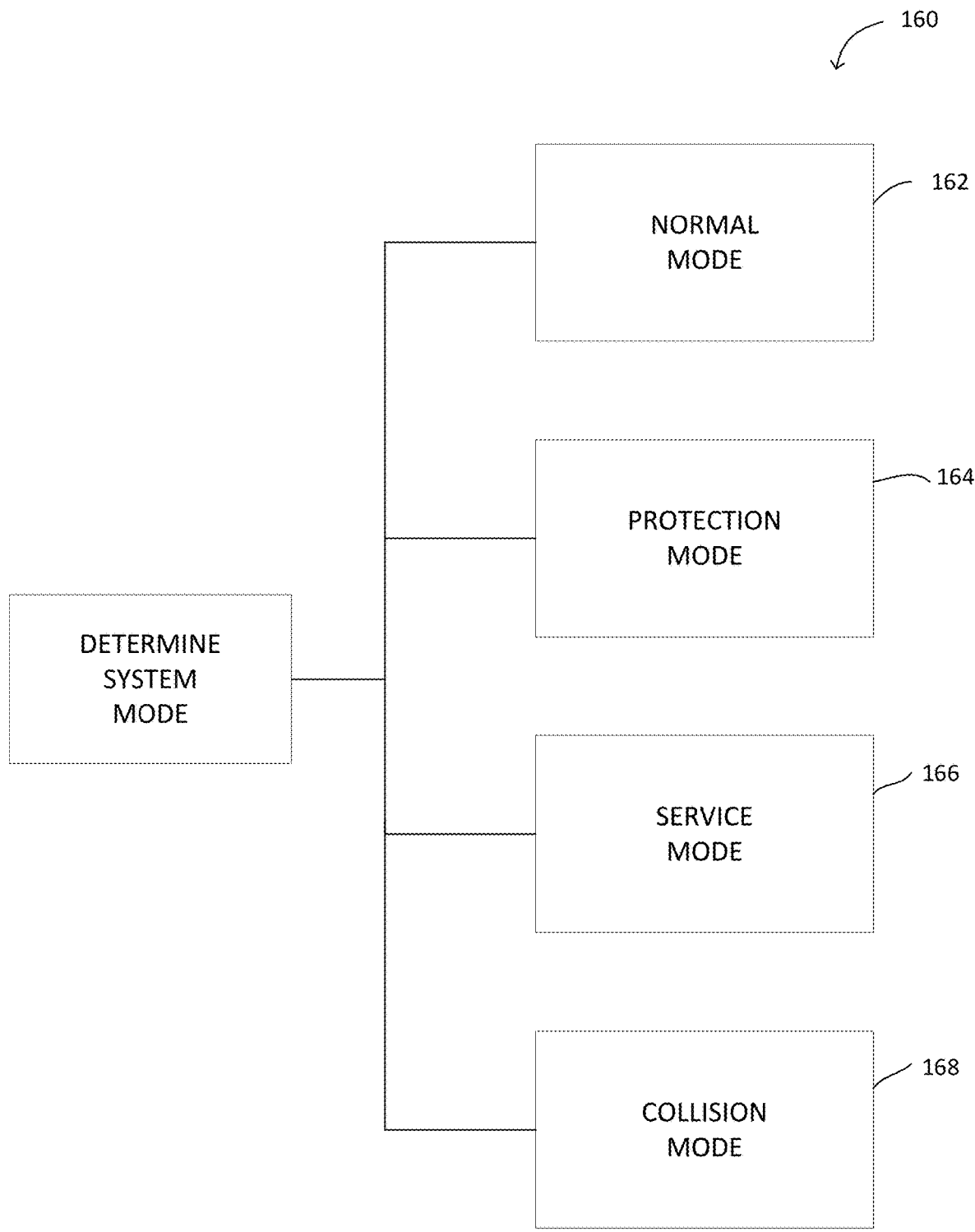
FIG. 3 illustrates a schematic diagram of a driver identification seatbelt system, as constructed in accordance with one or more embodiments.

The driver identification seatbelt system 100 determines the system mode from a number of modes 160, as shown in FIG. 3, depending on what is occurring with the vehicle. In one or more embodiments, the driver identification seatbelt system 100 includes one or more of a normal mode 162, a protection mode 163, a service mode 166, or a collision mode 168. In one or more embodiments, the driver identification seatbelt system 100 includes the normal mode 162 and the protection mode 163. In one or more embodiments, each mode is exclusive to the other.

The driver identification seatbelt system 100 selects the normal mode 162 when the fingerprint recognition member 140 evaluates a driver fingerprint against a stored fingerprint, and the fingerprints match, and is the default mode. In the normal mode 162, the seat belt system 120 has a normal seat belt function. The driver identification seatbelt system 100 selects the protection mode 164 when the fingerprint recognition member 140 evaluates a driver fingerprint against a stored fingerprint, and the fingerprints do not match.

Figure 5:
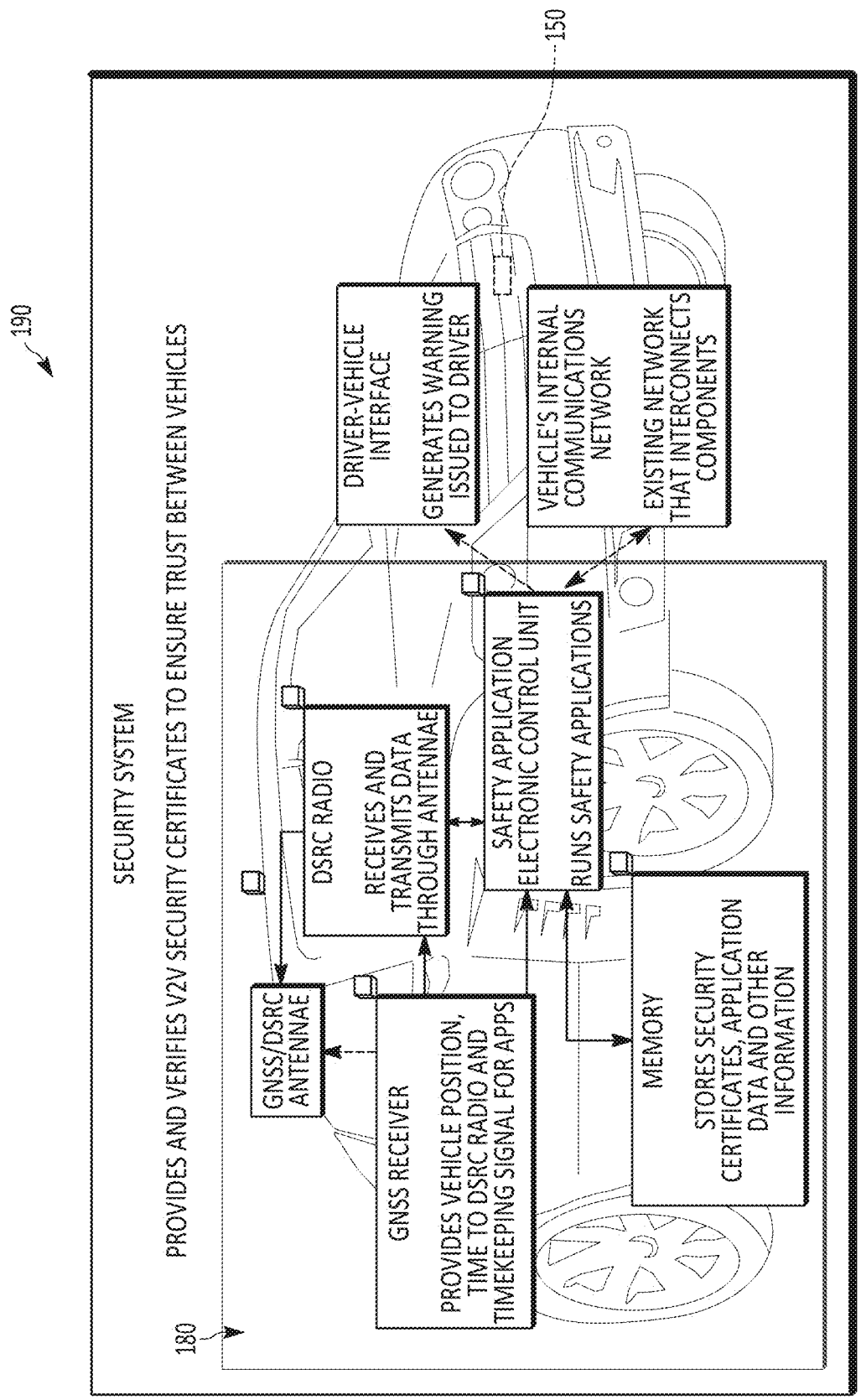
FIG. 5 illustrates a vehicle with a driver identification seatbelt system, as constructed in accordance with one or more embodiments.
Figure 6:
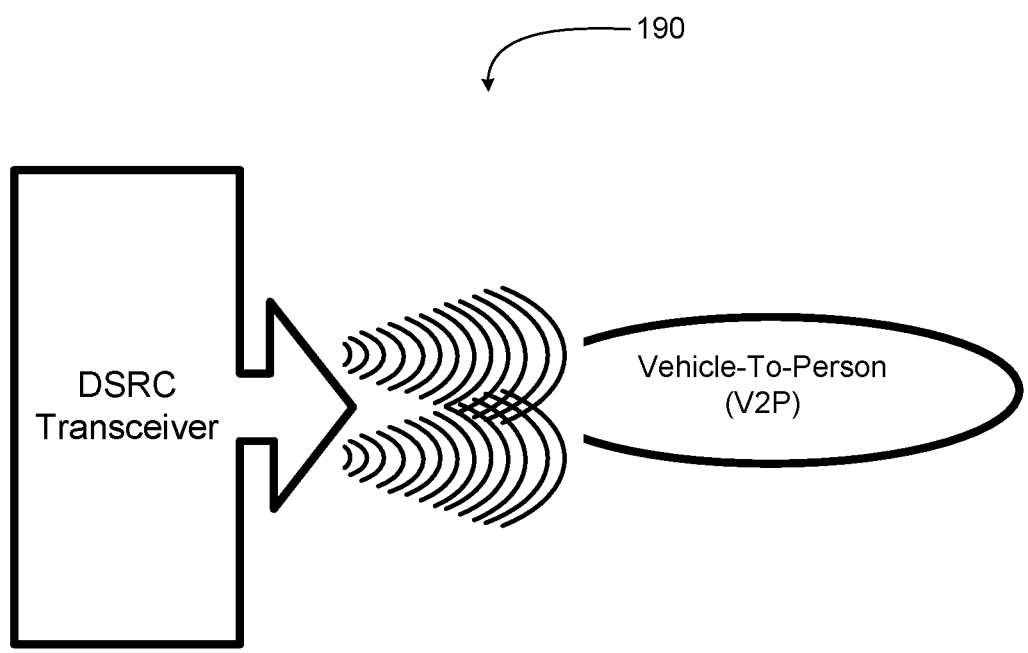
FIG. 6 illustrates a schematic diagram of a communications system for the driver identification seatbelt system, as constructed in accordance with one or more embodiments.

In the protection mode 164, various options are available, and the seat belt will perform protection actions to prevent the vehicle from being stolen. For example, in one or more embodiments, internal and/or external cameras of the vehicle are activated. Optionally, the driver's image with a warning message is sent to the vehicle owner with a communications system 190, for example by the V2P channel of V2X networks. The DSRC Transceiver is initiated to activate the in-vehicle V2X equipment such as RSRC radio to send the driver image and text message to the vehicle with the communications system 190, as shown in FIGS. 5-6. The communications system 190 is communicatively coupled with the processor 142. Furthermore, in protection mode the unauthorized driver's fingerprint and camera image will be stored in a memory as evidence for the authorities to investigate.

Further options for the protection mode 164 include locking the first and second coupling members 124, 128 such that the driver will not be able to release it. In one or more embodiments, if the vehicle speed is greater than 0 mph, for example when the driver puts the seatbelt system 120 on after the vehicle is moving, the vehicle speed will be limited to a pre-determined low speed mode, such as, but not limited to 15 to 20 mph. In one or more options, the driver identification seatbelt system 100 can be configured to require the seat belt be buckled in order to move the vehicle gear out of Park. In a further option, if the speed of the vehicle is 0 mph, and optionally if the gear state is on Park, the protection mode will activate an engine immobilizer 150 to prevent the engine from operating, where the engine immobilizer 150 is communicatively coupled with the processor 142. Meanwhile, the seatbelt system 120 is locked and the driver will not be able to release it.

In the service mode 166, the seatbelt function is disabled so that a service technician can drive the vehicle without having to store fingerprints of the service technician within the vehicle. For the collision mode 168, when a collision of the vehicle occurs during protection mode 164, the protection mode 164 is terminated and the mode is transferred to the collision mode 168 and the protection features, or actions of the protection mode are disabled.

Figure 4:
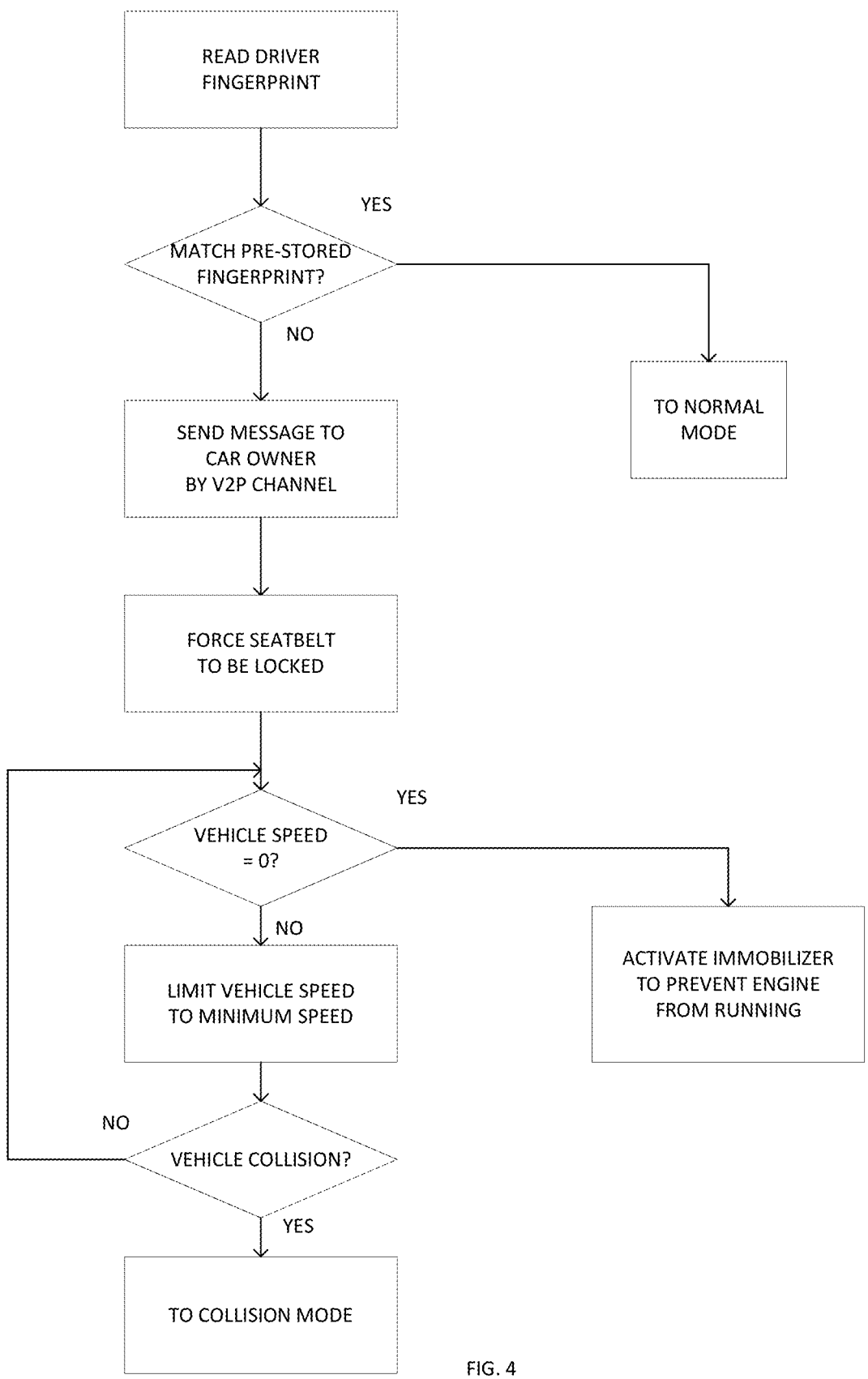
FIG. 4 illustrates a flowchart illustrating a method of use of the driver identification seatbelt system, as constructed in accordance with one or more embodiments.

Various embodiments of a method of operation of the driver identification seatbelt system 100 as shown in FIG. 4. The method includes storing fingerprints of authorized drivers. The method further includes detecting and reading a driver fingerprint with a driver identification seatbelt system of a vehicle, the driver identification seatbelt system including a seatbelt system having at least one first belt with a first coupling member, and a second coupling member, the seatbelt system further including a fingerprint recognition member, evaluating whether detected fingerprint matches a pre-stored fingerprint, and determining a system mode using the detected fingerprint.

If the detected fingerprint matches a pre-stored fingerprint, for example a fingerprint stored in memory for the system, the driver identification seatbelt system is placed into normal mode.

If the detected fingerprint does not match a pre-stored fingerprint, the driver identification seatbelt system is placed into protection mode. In one or more embodiments, a message is sent to the car owner, for example via the V2P channel using a DSRC transceiver (FIG. 6), and optionally the seatbelt is locked. In one or more embodiments, when in protection mode, the driver identification seatbelt system prevents the coupling members 124, 128 from unlocking, for example with a mechanical device and/or electronic controls. In one or more embodiments, cameras of the vehicle are used to take an image of the unauthorized driver, and the image is sent to the car owner (or an agent for the car owner). The driver identification seatbelt system further evaluates the speed of the vehicle. If the speed of the vehicle is 0 mph and/or the gear is in park, the engine immobilizer is activated to prevent the engine from running. If the speed of the vehicle is not 0 mph (for example during a car-jacking), the vehicle speed is limited to a minimum speed, such as, but not limited to 10-25 mph. In one or more embodiments, the engine will be stalled in a relatively short period of time, such as, but not limited to 10-15 minutes.

The driver identification seatbelt system further evaluates whether the vehicle has been in a collision. If the vehicle has been in a collision, the driver identification seatbelt system is placed in collision mode and the seatbelt system 120 is released. If the vehicle has not been in a collision, the driver identification seatbelt system continues to limit the speed of the vehicle and further evaluate whether a collision has occurred.

The car owner can further place the driver identification seatbelt system into a service mode, authorizing driving of the vehicle, for example when the vehicle is being serviced. The car owner can do this using their own fingerprint which has been pre-stored or using a personal communication device that is coupled with the system. The communication device includes but is not limited to a smart phone.

The driver identification seatbelt system and related methods described herein effectively deter and often prevent vehicle theft. The system further works to actively notify the owner of the attempted theft, and immobilize the vehicle to prevent additional theft attempts of the vehicle.

The above description is intended to be illustrative, and not restrictive. Many other embodiments will be apparent to those of skill in the art upon reading and understanding the above description. Embodiments discussed in different portions of the description or referred to in different drawings can be combined to form additional embodiments of the present application. The scope should, therefore, be determined with reference to the appended claims, along with the full scope of equivalents to which such claims are entitled.

The invention claimed is:

1. A driver identification seatbelt system comprising:
   at least one first belt with a first coupling member;
   a second coupling member configured to couple with the first coupling member; and
   at least one of the first coupling member or the second coupling member communicatively coupled with a fingerprint recognition member, the fingerprint recognition member having a fingerprint recognition function,
   wherein both the first coupling member and the second coupling member include the fingerprint recognition member.

2. The driver identification seatbelt system as recited in claim 1, further comprising at least one second belt coupled with the second coupling member.

3. The driver identification seatbelt system as recited in claim 1, wherein the driver identification seatbelt system has one or more of a normal mode, a protection mode, a service mode, or a collision mode.

4. The driver identification seatbelt system as recited in claim 1, wherein the fingerprint recognition member is disposed within or adjacent to at least one of the first coupling member to the second coupling member.

5. A driver identification seatbelt system:
   at least one first belt with a first coupling member;
   a second coupling member configured to couple with the first coupling member;
   at least one of the first coupling member or the second coupling member communicatively coupled with a fingerprint recognition member, the fingerprint recognition member having a fingerprint recognition function;
   a processor communicatively coupled with the fingerprint recognition member, the processor configured to evaluate whether a detected fingerprint matches a previously stored fingerprint; and
   an engine immobilizer communicatively coupled with the processor.

6. The driver identification seatbelt system as recited in claim 5, further comprising a communications system communicatively coupled with the processor.

7. A method comprising:
- detecting and reading a driver fingerprint with a driver identification seatbelt system of a vehicle, the driver identification seatbelt system including a seatbelt system having at least one first belt with a first coupling member, and a second coupling member, the seatbelt system communicatively coupled with a fingerprint recognition member;
- evaluating whether the detected fingerprint matches a pre-stored fingerprint;
- determining a system mode using the detected fingerprint; and
- sending a message to a car owner via V2P channel.

8. The method as recited in claim 7, further comprising setting the driver identification seatbelt system to a normal mode if the detected fingerprint matches the pre-stored fingerprint.

9. The method as recited in claim 7, further comprising setting the driver identification seatbelt system to a protective mode if the detected fingerprint does not match the pre-stored fingerprint.

10. The method as recited in claim 9, further comprising locking the first coupling member with the second coupling member.

11. A method comprising:
- detecting and reading a driver fingerprint with a driver identification seatbelt system of a vehicle, the driver identification seatbelt system including a seatbelt system having at least one first belt with a first coupling member, and a second coupling member, the seatbelt system communicatively coupled with a fingerprint recognition member;
- evaluating whether detected fingerprint matches a pre-stored fingerprint; and
- determining a system mode using the detected fingerprint; and
- determining a velocity of the vehicle.

12. The method as recited in claim 11, further comprising activating an engine immobilizer and preventing operation of an engine of the vehicle if the velocity of the vehicle is equal to 0 mph or a gear state is in park.

13. The method as recited in claim 11, further comprising limiting velocity of the vehicle if the velocity of the vehicle is greater than 0 mph.

14. A method comprising:
- detecting and reading a driver fingerprint with a driver identification seatbelt system of a vehicle, the driver identification seatbelt system including a seatbelt system having at least one first belt with a first coupling member, and a second coupling member, the seatbelt system communicatively coupled with a fingerprint recognition member;
- evaluating whether the detected fingerprint matches a pre-stored fingerprint;
- determining a system mode using the detected fingerprint; and
- evaluating whether the vehicle has been in a vehicle collision and placing the driver identification seatbelt system into a collision mode if the vehicle collision has been detected.

15. A method comprising:
- detecting and reading a driver fingerprint with a driver identification seatbelt system, the driver identification seatbelt system including a seatbelt system having at least one first belt with a first coupling member, and a second coupling member, the seatbelt system further including a fingerprint recognition member;
- evaluating whether the detected fingerprint matches a pre-stored fingerprint;
- determining a system mode using the detected fingerprint; and
- further comprising sending a message to a car owner via V2P channel.

16. A method comprising:
- detecting and reading a driver fingerprint with a driver identification seatbelt system, the driver identification seatbelt system including a seatbelt system having at least one first belt with a first coupling member, and a second coupling member, the seatbelt system further including a fingerprint recognition member;
- evaluating whether the detected fingerprint matches a pre-stored fingerprint;
- determining a system mode using the detected fingerprint;
- determining a velocity of a vehicle; and
- activating an engine immobilizer and preventing operation of an engine of the vehicle if the velocity of the vehicle is equal to 0 mph or a gear state is in park.

* * * * *